Inventor:
George H. Harred

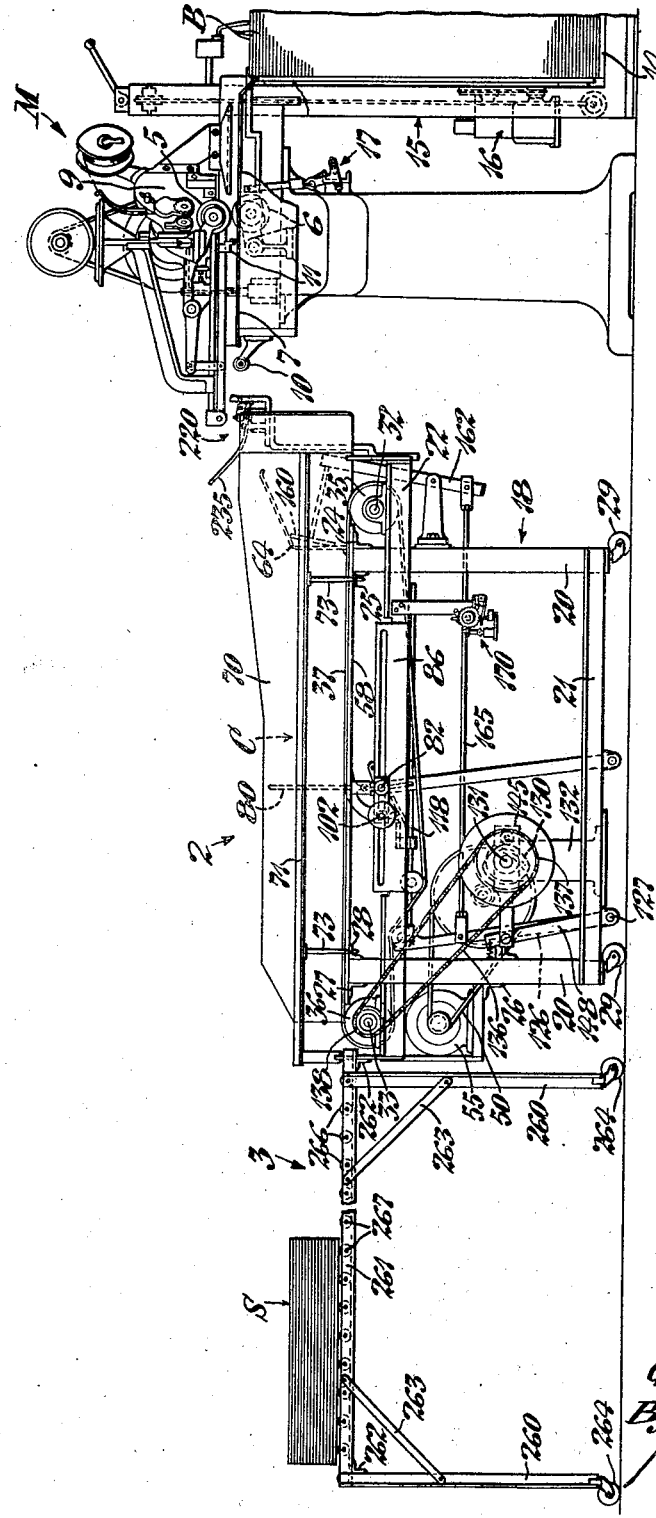

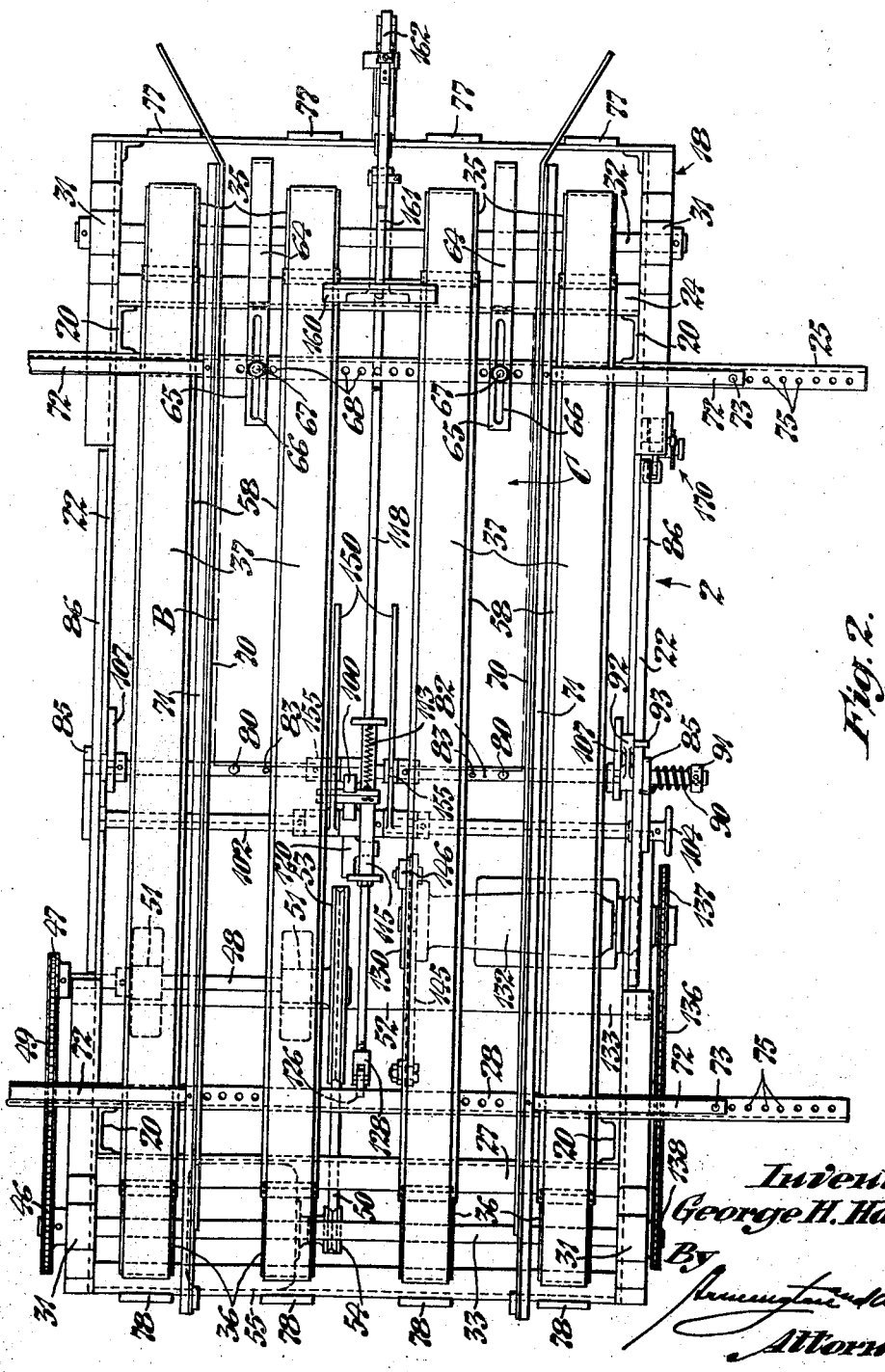

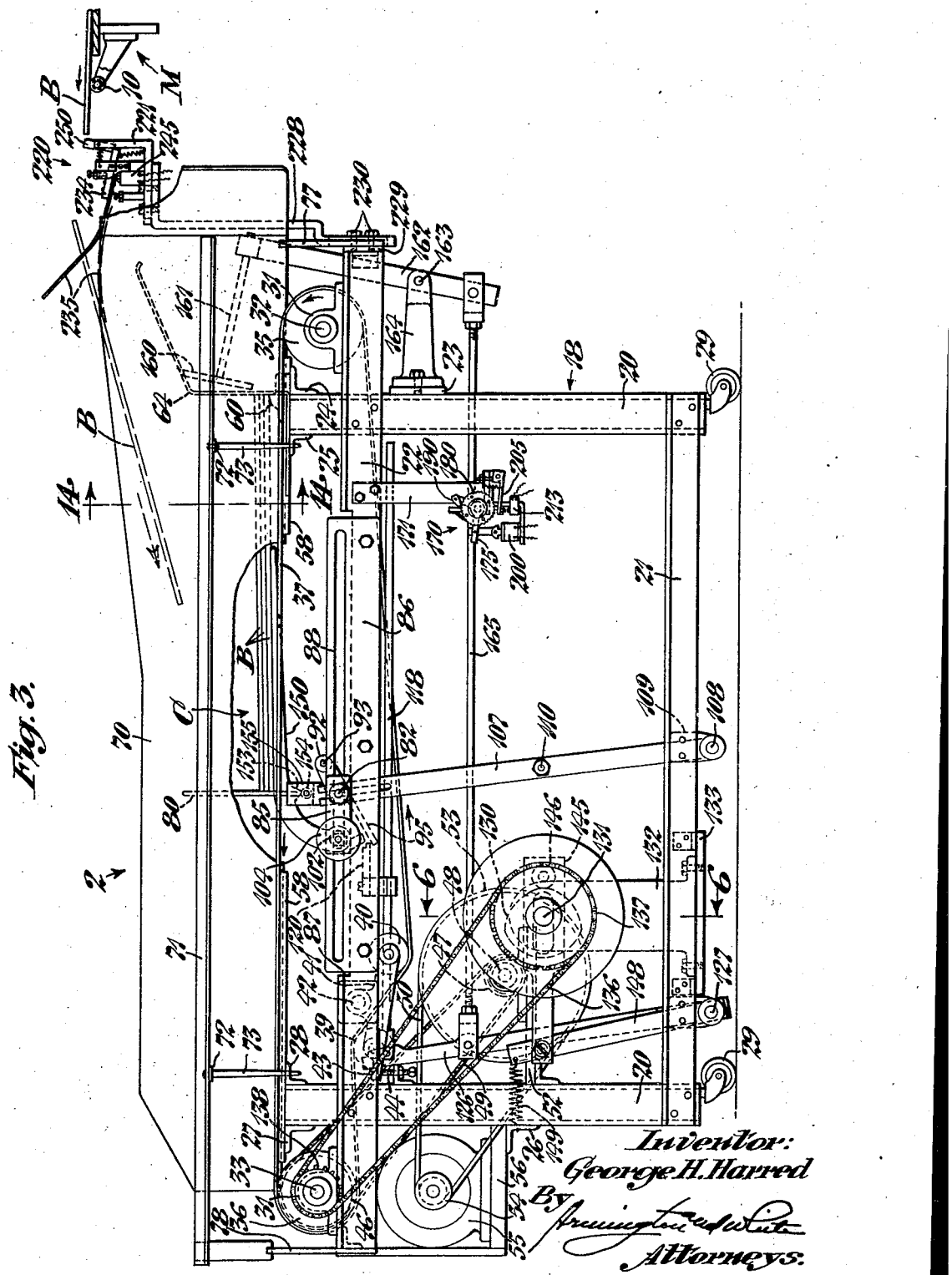

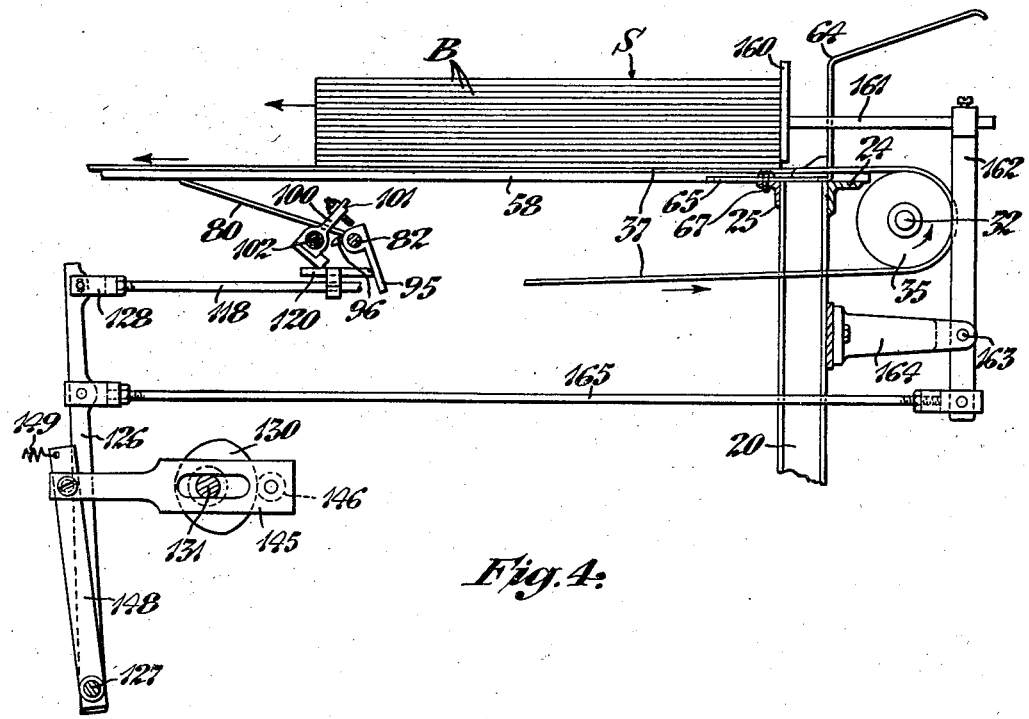

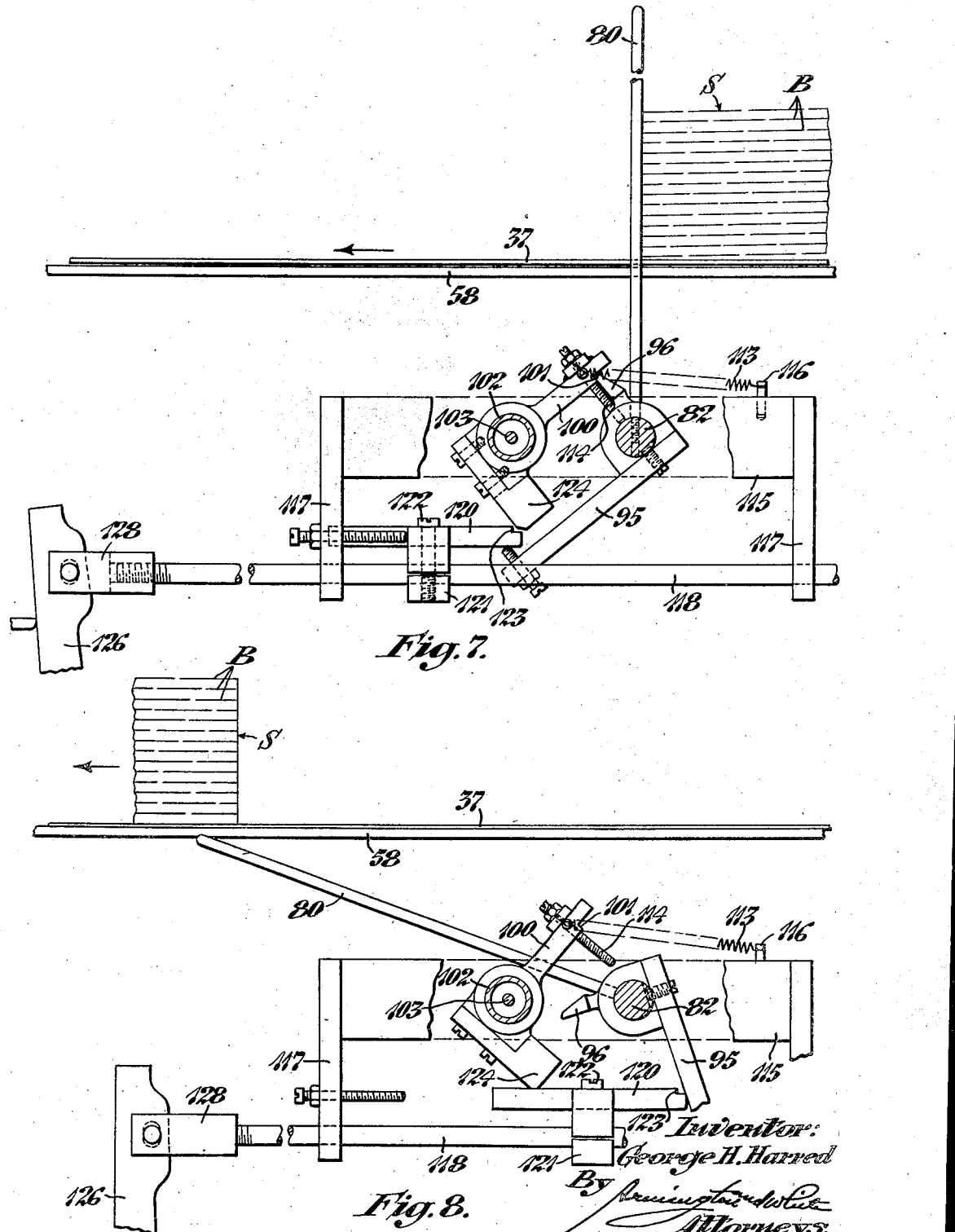

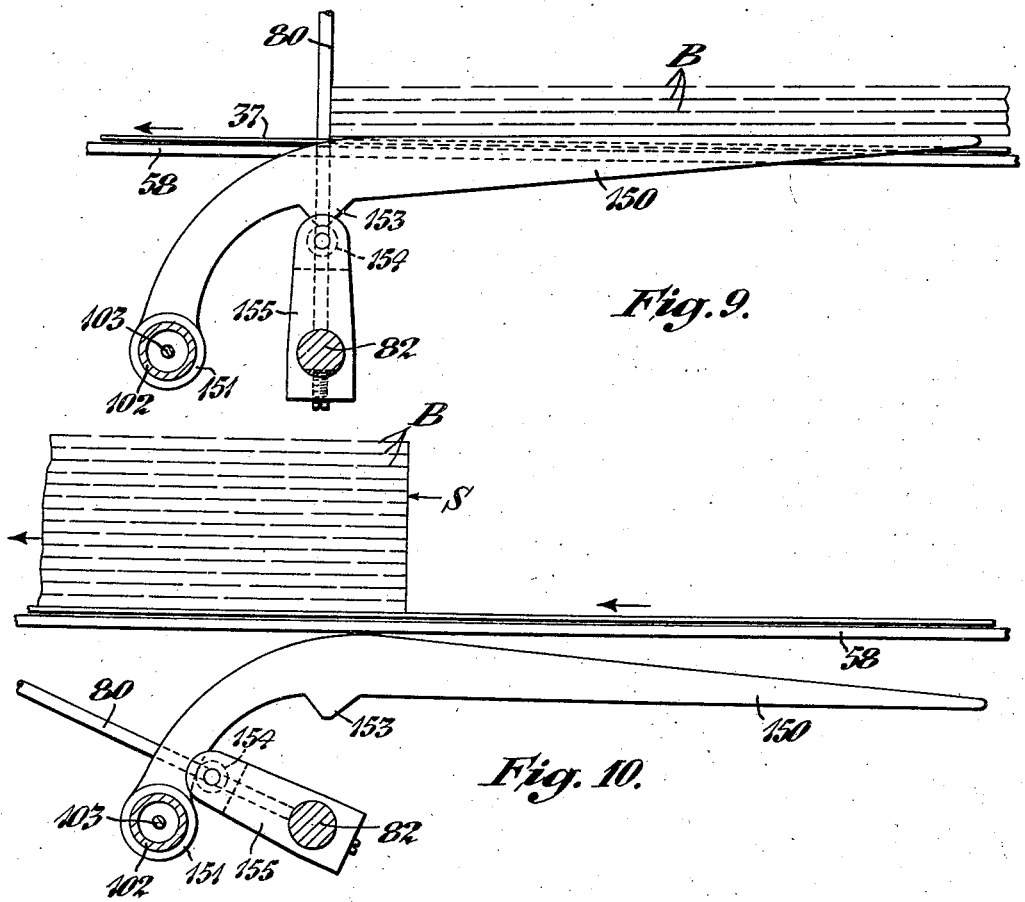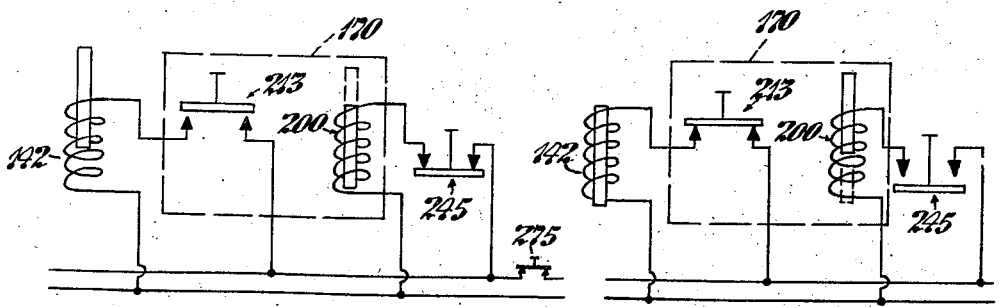

July 15, 1947.　　　G. H. HARRED　　　2,424,093
APPARATUS FOR STACKING AND TRANSPORTING OBJECTS
Filed Feb. 11, 1944　　　10 Sheets-Sheet 9

Inventor:
George H. Harred
By
Attorneys.

Patented July 15, 1947

2,424,093

UNITED STATES PATENT OFFICE 2,424,093

APPARATUS FOR STACKING AND TRANSPORTING OBJECTS

George H. Harred, East Greenwich, R. I., assignor to Boston Wire Stitcher Company, Portland, Maine, a corporation of Maine Application February 11, 1944, Serial No. 522,012

8 Claims. (Cl. 93—93)

This invention relates to apparatus for transferring various objects from a machine to another location and particularly to an apparatus for counting sheets, carton-blanks or the like as they are delivered from a processing machine and transporting them in measured quantities to a desired location.

One object of the invention is to provide an apparatus of the type indicated adapted to receive carton-blanks or similar sheet-like articles as they are discharged from a processing machine, count and stack predetermined numbers of the blanks to form groups or piles and thereafter transport the piles to a location where the blanks may be further processed or tied together in bundles suitable for shipping.

Another object of the invention is to provide an apparatus of the type indicated comprising continuously moving conveyor-belts, a compartment arranged above the belts and adapted to receive the blanks as they are discharged from the processing machine, means for retaining the blanks in stacked relationship in the compartment, means for counting the blanks as they are stacked in the compartment, and means operative after a predetermined number of blanks have been stacked in the compartment for releasing the retaining means and opening the compartment to permit the stack of blanks to descend upon the belts to be transported thereby to another location.

Another object of the invention is to provide an apparatus of the type indicated in which the stack-retaining means is returned promptly to operative position to retain the first carton-blank of a succeeding series or group delivered to the apparatus so that the operation of the processing machine need not be retarded or arrested between groups of the blanks and maximum efficiency and production of the machine can be maintained.

Another object of the invention is to provide an apparatus of the type indicated having a simple blank-counting mechanism which is electrically operated and controlled by means actuated by each blank being delivered to the compartment.

Another object of the invention is to provide an apparatus of the type indicated in which the counting of the carton-blanks is controlled by means actuated by the rearward or trailing edge of each blank to insure that the last blank of each predetermined number of units will be positively stacked in the compartment before the stack is released to move with the conveyor-belts.

Another object of the invention is to provide an apparatus of the type indicated having means for maintaining the blanks in alined stacked relationship during the formation of the stack in the compartment and its movement with the conveyor-belts.

Further objects of the invention are set forth in the following specification which describes a preferred form of construction of the apparatus and a modified form of controlling unit therefor, by way of example, as illustrated by the accompanying drawings. In the drawings:

Fig. 1 is a side elevational view of a sheet-processing machine showing the improved unit-counting, stacking and delivery apparatus as applied to use therewith;

Fig. 2 is an enlarged plan view of the combined sheet-counting, stacking and delivering apparatus;

Fig. 3 is a side elevational view of the same;

Fig. 4 is a longitudinal sectional view of the apparatus showing the sheet-alining means as operative to aline the sheets of a stack or group during the initial movement of the latter from the apparatus;

Fig. 5 is a plan view of the stack-supporting means showing the parts thereof in position to restrain the stack from movement with the continuously moving conveyor-belts;

Fig. 6 is a transverse sectional view on line 6—6 of Fig. 3 showing the means for actuating the stack-retaining means;

Fig. 7 is a further enlarged side view of the means for latching the stack-retaining fingers in operative position;

Fig. 8 is a view similar to Fig. 7 showing the latching means as unlocked to release the stack-retaining fingers to permit the completed stack of sheets to be transported by the conveyor-belts;

Fig. 9 is a side view of the stack-supporting rests showing them in position to support a stack of sheets or carton-blanks;

Fig. 10 is a view similar to Fig. 9 illustrating the stack-supporting rests as rocked downwardly to lower the stack of sheets onto the conveyor-belts to adapt it to be transported thereby;

Fig. 19 is an electrical-circuit diagram indicating the relationship of the various switches and electromagnets prior to and following the passage of a sheet or carton-blank into the apparatus;

Fig. 20 is a similar diagram indicating the relationship of the switches and electromagnets immediately following the delivery of the last carton-blank from the processing machine into the conveyor and showing the circuit for controlling the actuation of the stack-releasing means as closed;

Figure 21:
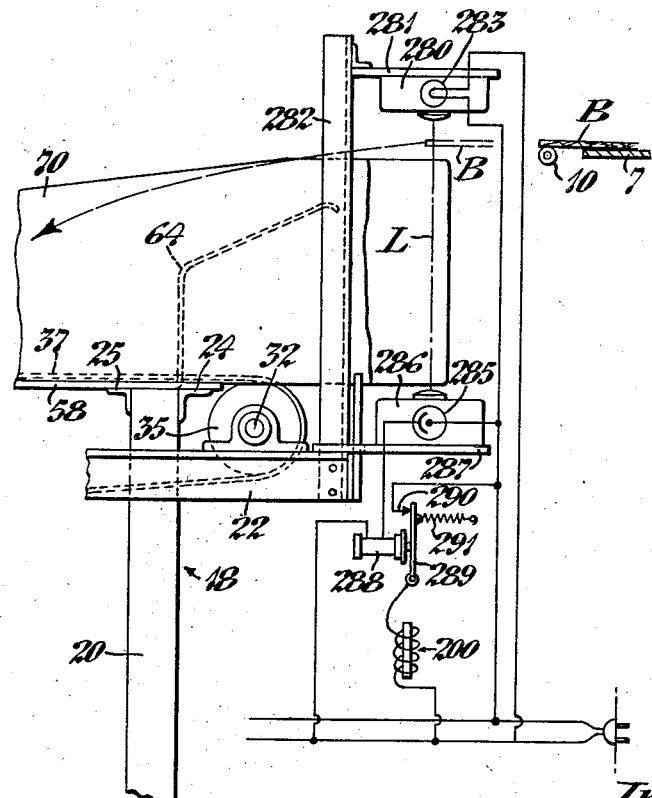
Figure 22:
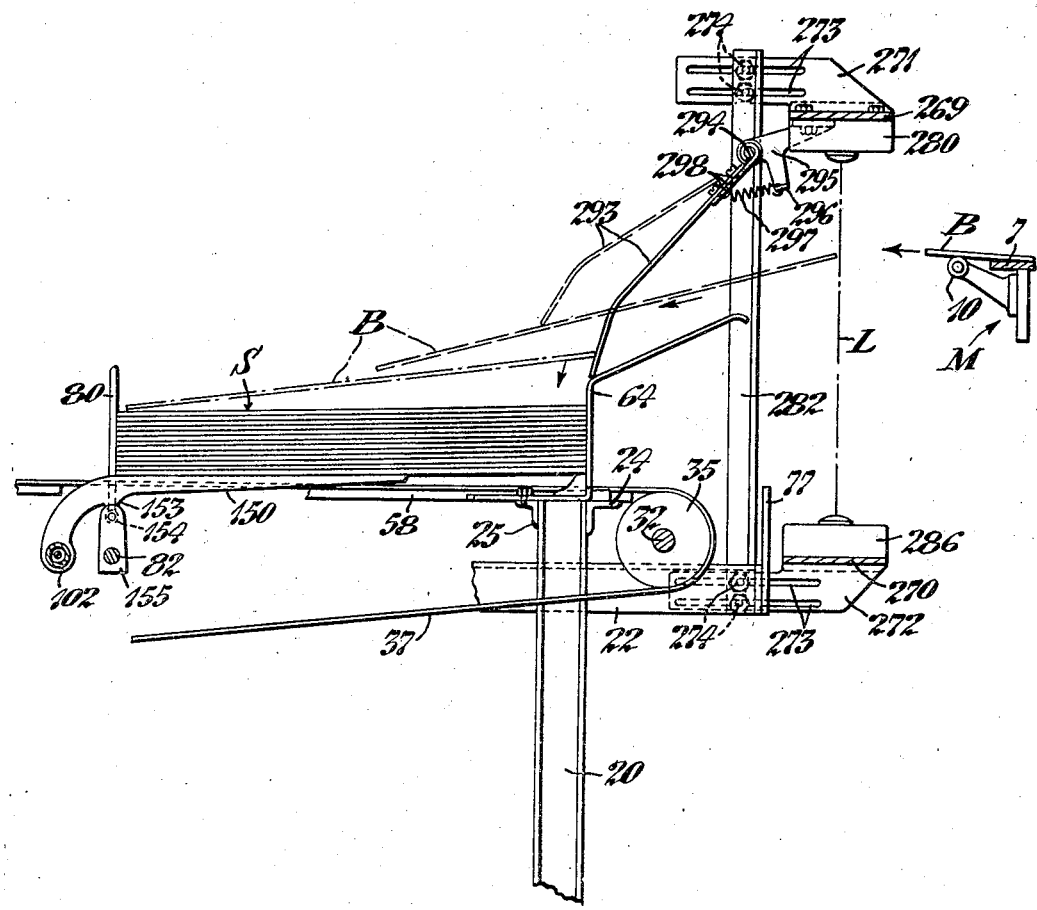

Fig. 21 is a side elevational view of one end of the combined sheet-counting, stacking and transferring apparatus showing a modified form of control device embodying a light-sensitive or photo-electric unit which is operative upon passage of a sheet or carton-blank into the apparatus to control the actuation of the sheet-counting device; and Fig. 22 is a side elevational view of a portion of the apparatus showing further modifications in the control unit and other details.

In the manufacture of various sheet-like articles it is a common practice to deliver processed articles from the cutting, printing, labeling, taping, stitching or other processing machine and to manually group the articles in a stack. The articles in the stack are handled, counted and tied together manually in bundles suitable for shipping. The number of sheets contained in each stack or bundle is dependent upon the size and type of the processed articles and the purpose for which they are to be used. For example, cartons are usually manufactured in plants embodying machines for carrying out the various steps of cutting the sheet material to the required size, slitting and scoring the blanks to form the panels and flaps of the cartons, stitching or taping the flaps together and finally counting the completed carton-blanks and tying them together in groups or bundles of predetermined number. These bundles of carton-blanks then may be shipped to plants engaged in the manufacture or processing of various articles to be packed and shipped in the cartons or containers.

The present invention is concerned particularly with means for receiving processed sheet-like articles as they are delivered from any usual processing machine, counting and arranging the articles in groups or stacks of predetermined number and transporting the stacks to a location where the articles may be further processed or tied in bundles for shipping. More specifically, the present improved apparatus comprises a series of continuously moving conveyor-belts, means for receiving and stacking the sheet-like articles above the conveyor-belts, means for counting the individual sheets as they are delivered by the processing machine and stacked above the belts, and means operative after a predetermined number of sheets have been stacked to release the completed stack and cause it to be transported by the belts to a location where the sheets may be further processed or tied in bundles.

Example of processing machine

Referring to Fig. 1 of the drawings, the present improved apparatus, designated generally by the reference character 2, is herein shown as applied to use with a carton-stitching or stapling machine M and adapted to receive the stitched carton-blanks as the latter are delivered from the machine. It is to be understood, however, that the wire-stitching machine M is herein shown merely as an example and that the present apparatus may be employed for counting and stacking various objects or articles as the latter are delivered from a cutting, printing, taping or other processing unit. After the articles have been counted and arranged in groups or stacks of predetermined number the stacks are transported or conveyed from the apparatus 2 and may be deposited on a table 3 in position to be tied to form bundles suitable for shipping or handling for other purposes.

The wire-stitching machine M, herein shown by way of example, may be of the type disclosed in my prior application for United States Letters Patent, Serial No. 468,646, filed December 11, 1942. Since the sheet-processing machine is herein shown merely to disclose means for delivering sheet-like articles to the conveyor 2, its construction and method of operation will be described only briefly as relating to the operation of the conveyor. Suffice it to state that the wire-stitching machine M comprises a pair of rolls 5 and 6 for intermittently feeding carton-blanks laterally across a table 7 to stitching mechanism in a head 9. The wire-stitching mechanism contained within the head 9 is adapted to apply wire staples to the carton-blanks at spaced intervals therealong with the feed-rolls 5 and 6 advancing the blanks between stitches. After a predetermined number of staples have been applied to stitch together the flaps of a carton-blank, the rolls 5 and 6 are rotated at high speed to eject the stitched blank from the machine. As the blank is delivered from the stitching machine M it rides across a roller 10 rotatably supported from the frame of the machine. As explained in the patent application referred to above, the carton-blanks B may be stacked in a pile on a platform 14 of an elevator 15 with hydraulic means, indicated at 16, provided for automatically raising the platform to maintain the topmost blank at a level to be conveniently grasped by the operator. To facilitate the manual withdrawal of a blank B from the supply stack, a sheet-displacing mechanism, such as shown generally at 17 and described in the above-named application, may be employed for displacing or jogging the topmost sheet or blank laterally to adapt it to be conveniently grasped by the operator who may then fold the blank and insert it between the feed-rolls 5 and 6 to initiate the wire-stitching operation.

It is a common practice when stitching carton-blanks to cause the blanks to be deposited on the floor or upon a truck where they build up to form a pile or stack. The blanks are counted and arranged manually in groups or stacks of predetermined number which are tied to form bundles. The stitched carton-blanks usually are piled more or less haphazardly which results in an uneven stack so that it is not only difficult to count the units but it happens often that the pile topples over to further complicate the bundling operation. To avoid the difficulties above explained the present invention provides an improved apparatus for receiving and stacking the blanks as they are delivered from the processing machine, counting the blanks as they are stacked and transporting the completed stacks to another location where they may be bundled.

General organization of the apparatus

As shown in Figs. 2 and 3, the apparatus 2 comprises a rectangular framework 18 in the form of a table supported by four legs or corner posts 20, preferably constructed from channel irons. The legs 20 at opposite sides of the frame are joined by longitudinally-extending braces or struts 21 and 22. The legs 20 at the forward end of the frame are connected by a bar 23 and a pair of angle-iron braces 24 and 25. The legs at the opposite end of the frame 18 may be joined by angle-iron braces 26, 27 and 28. Casters 29 may be mounted at the lower ends of the legs 20 to adapt the apparatus 2 to be moved into position adjacent the particular machine with which it is to be used. At the opposite ends of the frame 18 the struts 22 extend beyond the legs 20 to provide overhanging brackets for supporting bearings 31 in which the ends of transverse shafts 32 and 33 are journaled, see Fig. 2. Pinned or otherwise secured to the shafts 32 and 33 are relatively wide pulleys or wheels 35 and 36 respectively, see Fig. 2. Passing around the pulleys 35 and 36 are a plurality of belts 37 which serve as the means for conveying the stacks of carton-blanks from the apparatus in the manner explained hereinafter. The belts 37 also pass around idler pulleys 39 and 40 rotatably mounted at the opposite ends of pivoted arms 41, see Fig. 3. The arms 41 are pivoted on a rod 42 extending across the framework 18 and are provided with projections 43 engageable by set-screws 44 on the frame. By adjusting the set-screws 44 the arms 41 may be rocked to cause the pulleys 39 and 40 to tighten or slacken the conveyor-belts 37 as required. As shown in Figs. 2 and 3, a sprocket 46 fast on the end of the shaft 33 is driven from a smaller sprocket 47 on a countershaft 48 by means of a chain 49. The countershaft 48 is journaled in bearings 51 mounted on a shelf or ledge 52 supported from the legs 20 and carries a relatively large pulley 53 which is driven from a smaller pulley 54 fast on the shaft of an electric motor 55 by means of a belt 59. The motor 55 is mounted on a shelf or bracket 56 at the rearward end of the framework 18 and through the connections last described it drives the pulleys 36 for continuously traveling the conveyor-belts 37.

Fastened to the top of the angle-irons or cross-struts 24 and 27 of the framework 18 are longitudinally-extending supporting strips 58, see Figs. 2 and 3. As shown in Fig. 3, the strips 58 underlie the upper portion of each conveyor-belt 37 to prevent the belts 37 from sagging and to take the weight of the stacks or groups of carton-blanks as the latter are moved by the belts.

Stack-retaining means and operating mechanism therefor

Figure 14:
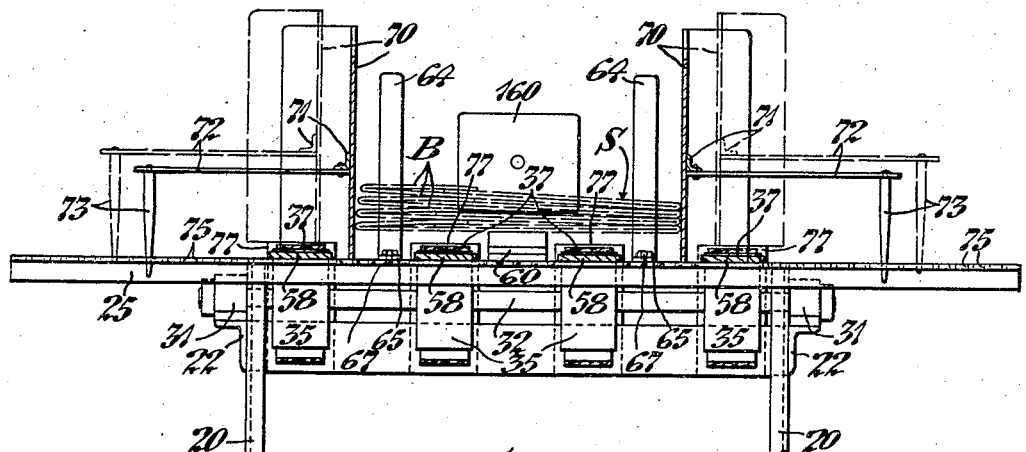
Fig. 14 is a transverse sectional view on line 14—14 of Fig. 3 showing the longitudinally-extending guide-plates for alining the lateral edges of the carton-blanks as they are received in the apparatus and indicating in dash-lines the manner of adjusting the guide-plates laterally to accommodate blanks of various widths.

After the carton-blanks B are stitched or otherwise processed they are ejected from the machine M and deposited in a compartment C where they are held elevated slightly above the conveyor-belts 37 by means of a rest or block 60 at one end supported on the cross-strut 24, see Figs. 3 and 4, and also a pair of pivoted stack-supporting fingers or rests 150 to be later described in detail. The compartment C is bounded at its rearward end by upstanding rockable fingers or stops 80, to be later described, and at the front by angularly-shaped fingers 64. As shown in Figs. 2, 3 and 14, the fingers 64 have horizontal portions or feet 65 provided with elongated slots 66 through which a screw 67 is adapted to be inserted in any one of a series of threaded holes 68 in the cross-strut 25 of the frame 18. Through this provision the fingers 64 may be adjusted both laterally and longitudinally of the conveyor-belts to accommodate carton-blanks of various sizes. As shown in Figs. 3 and 4, the upper end of each finger 64 slopes forwardly and upwardly toward the machine M to provide inclined ramps for guiding the carton-blanks B into the compartment C. The lateral walls of the compartment C are constituted by a pair of vertical plates 70 extending longitudinally throughout the entire length of the conveyor-apparatus 2. The side plates 70 may be constructed from plywood or suitable wallboard to render them light in weight and reinforced by longitudinal angle-irons 71 which project beyond their rearward ends as shown in Fig. 3. Secured to the angle-irons 71 are laterally-projecting arms 72 which carry depending pins 73, see Fig. 14. As shown in this latter view, the lower ends of the pins 73 are tapered to adapt them to be received in holes 75 drilled through the horizontal flanges of the cross-struts 25 and 28, it being noted that the struts project beyond the sides of the apparatus for this purpose. By adjusting the side plates 70 laterally toward or away from each other the width of the compartment C may be varied to adapt carton-blanks B of different widths to be received therein. After the side plates 70 have been adjusted laterally their tapered pins 73 are entered into the appropriate holes 75 to maintain them in upright position as shown in Fig. 14. In certain positions of adjustment the side plates 70 will be arranged between the conveyor-belts 37 with their lower edges resting upon the cross-struts 25 and 28. When the plates 70 are adjusted in alinement with the conveyor-belts 37, their lower edges will rest upon the upper ends of plates 77 and 78, shown in Fig. 3, which are attached to the forward and rearward ends of the framework 18, see dash-lines in Fig. 14. The lower edges of the side plates 70 thus will be spaced slightly above the conveyor-belts 37 to prevent their contact therewith. It will be noted from the above description that the size of the compartment C may be adjusted to accommodate carton-blanks B of different lengths and widths.

The stop-fingers 80, previously mentioned as constituting the rearward wall of the compartment C, are carried by a rock-shaft 82 extending transversely across the frame of the apparatus. The fingers 80 are in the form of round rods with their lower threaded ends adapted to be screwed into any of a series of threaded holes 83, see Fig. 5, in the rock-shaft 82. The fingers 80 act as abutments for engaging the edge of each carton-blank as it is projected into the compartment C. As shown in Figs. 3 and 5, the ends of the rock-shaft 82 are journaled in bearing plates 85 mounted for longitudinal adjustment on guide-plates 86 fastened to the longitudinal braces or struts 22, the lateral flanges of the angle-iron struts being cut away as shown at 87 for this purpose. The rock-shaft 82 projects through elongated horizontal slots or openings 88 in the guide-plates 86 and square bosses 89 on the bearing plates 85, see Fig. 5, also project into the slots to prevent tilting of the bearing plates while adapting them to be adjusted longitudinally therealong for the purpose of adjusting the length of the compartment C. A spring 90 coiled around one end of the rock-shaft 82 has one end engaging in a hole in one of the bearing plates 85 and its opposite end held by a collar 91 fast on the shaft, thus tending to rock the latter in clockwise direction, as viewed in Fig. 3, and maintain the stop-fingers 80 in upright position. An arm 92 fast on the rock-shaft 82 carries a laterally-projecting pin 93 adapted to engage the upper edge of the guide-plate 86 to limit the rocking movement of the shaft 82 in this direction. The arm 92 takes the axial thrust of the shaft 82 in one direction while the thrust in the opposite direction is resisted by a collar 94 fast on the opposite end of the shaft, see Fig. 5.

An inclined arm 95, see Figs. 7 and 8, is secured to the rock-shaft 82 at a point substantially midway of its ends with a detent-finger 96 projecting upwardly from the hub of the arm. The detent-finger 96 cooperates with a shoulder 101 of a latching element 100, see Figs. 7 and 8, rockably mounted on a hollow shaft 102 extending between the bearing plates 85 on the frame 18 in parallel relation to the rock-shaft 82, see also Fig. 5. This engagement between the detent-finger 96 and the latching element 100 normally restrains the rock-shaft from rocking movement in counterclockwise direction. Extending through the hollow shaft 102 is a rod 103, see Fig. 5, having a handwheel 104 fastened thereto at one end. This end of the rod 103 passes through a hole in one bearing plate 85 while its opposite end is threaded to adapt it to be screwed into a threaded hole in the opposite bearing plate to clamp both bearing plates against the sides of the guide-plates 86. Collars 105 on the rod 103 interposed between the ends of the hollow shaft 102 and the guide-plates 86 provide frictional resistance to the turning of the shaft. By turning the handwheel 104 to unscrew the rod 103 the bearing plates 85 may be freed to permit their adjustment longitudinally of the guide-plates 86. To prevent canting of the shafts 82 and 102 and maintain them in position at right-angles to the sides of the frame 18 a pair of levers 107 is provided. As shown in Fig. 3, the levers 107 are mounted in spaced relationship on a lower shaft 108 pivotally mounted in brackets 109 at the bottom of the frame 18 and extending transversely thereof. The upper ends of the levers 107 are forked for engaging the rock-shaft 82 as shown in Figs. 3 and 5 and may be rigidly connected together by means of a tie-rod 110.

The latching element 100 is adapted to be rocked in clockwise direction as viewed in Figs. 7 and 8, to engage its shoulder with the end of the detent-finger 96 by means of a spring 113 having one end connected to a lateral projection on the latch and its opposite end anchored to a pin 116 on a bracket 115. Rocking movement of the latching element 100 in this direction is limited by the engagement of a set-screw 114 on the element with the shaft 82 as shown in Fig. 7. The bracket 115, previously referred to, is provided with openings for receiving the shafts 82 and 102 to adapt it to be mounted thereon and is formed with depending legs 117 at its opposite ends. A rod 118 is slidably mounted in bearings in the legs 117 of the bracket 115 and carries a horizontal bar 120. As shown in Fig. 7, the bar 120 has a laterally-offset depending portion 121 bored to receive the rod 118 and split at one side with a screw 122 for clamping it to the rod. The bar 120 is provided with a shoulder 123 at one end. When the rod 118 is slid from the position shown in Fig. 7 to that illustrated in Fig. 8 the shoulder 123 on the bar 120 will engage the lower end of the depending portion 124 of the latching element 100 to rock the latter in counterclockwise direction and release the detent-finger 96. Continued sliding movement of the rod 118 toward the right, as viewed in Fig. 7, will cause the end of the bar 120 to engage against the inclined arm 95 to rock the latter and rock-shaft 82 in counterclockwise direction, see Fig. 8, whereby to rock the stop-fingers 80 to a position below the level of the conveyor-belts 37 to open the end of the compartment C as shown in Fig. 4 and release the stack S of carton-blanks B to permit them to be transported by the belts.

The means for sliding the rod 118 consists in a lever 126 secured fast to a shaft 127 which is rockably mounted in bearings at the bottom of the frame 18. The rod 118 has a bifurcated member 128 pivotally connected to the upper end of the lever 126 by a pin passing through a slot therein. The shaft 127 is adapted to be rocked in clockwise direction, as viewed in Fig. 3, by means of a cam 130 carried by a shaft 131 journaled in bearings in a standard 132, see Fig. 6. As shown in this latter view, the standard 132 may be supported by a plate 133 extending across the frame 18 with its ends secured to the longitudinal struts 21. The cam-shaft 131 is adapted for rotation through a clutch, indicated generally at 135 in Fig. 6, one member of the clutch being driven continuously from the conveyor-pulley shaft 33 by means of a chain 136 passing around sprockets 137 and 138 on the clutch-element and shaft, respectively, see also Fig. 3. A clutch-actuating pin 140 slidable in a bore in the standard 132 is operated from a pivoted bell-crank lever 141, see Fig. 6. The bell-crank lever 141 is arranged to be rocked by means of a link 143 connected between one end of the lever and the armature of an electromagnet 142. When the electromagnet 142 is energized the bell-crank lever 141 is rocked to withdraw the pin 140 to cause the driven clutch-element to be rotated from the driving element. In this manner the cam-shaft 131 and cam 130 are rotated during prescribed intervals. The energization of the electromagnet 142 is of short duration so that the pin 140 will be engaged with the driven clutch-element to arrest the rotation of the shaft 131 after the latter has been turned through one complete revolution. A slide-plate 145 has an elongated opening through which the cam-shaft 131 extends and carries a follower-roller 146 engageable with the periphery of the cam 130, see Figs. 4 and 6. As shown in Figs. 3 and 4, the end of the slide-plate 145 is pivotally connected to the upper end of a lever 148 fast on the rock-shaft 127. A spring 149 connected between the lever 148 and the frame 18 maintains the roller 146 in engagement with the cam 130. When the cam 130 is rotated from the position illustrated in Fig. 3 to that shown in Fig. 4 the lever 148, shaft 127 and lever 126 will be rocked in clockwise direction to slide the bar 120 toward the right whereby to unlatch the fingers 80 for the purpose before explained. The electromagnet 142 is connected in circuit with a switch 213, see Fig. 19, which is controlled by a counting device 170, to be described later. When a predetermined number of carton-blanks B have been stacked in the compartment C the switch 213 is closed to energize the electromagnet 142 and through the instrumentalities described above the stack S is released by the fingers 80 and permitted to travel with the conveyor-belts 37 after it has been lowered onto the latter.

Stack-supporting means

The blank-supporting fingers or rests 150, previously mentioned, are shown in detail in Figs. 9 and 10. The rests 150 are formed with hubs 151 pivotally mounted on the hollow shaft 102 and extend forwardly therefrom in curved portions terminating in tapering fingers 150 for supporting the carton-blanks B as they build up in a stack S. Projecting downwardly from the rests 150 adjacent their curved portions are V-shaped cam-lobes 153. The lobes 153 are adapted to be engaged by rollers 154 mounted between the sides of the upper forked ends of arms 155 secured to the rock-shaft 82. When the arms 155 are in the position shown in Fig. 9 their rollers 154 will be located directly beneath the lobes 153 to maintain the rests 150 elevated; but when the shaft 82 is rocked to tilt the stop-fingers 80 the rollers 154 will ride out from under the lobes to permit the rests to rock downwardly and the stack S of carton-blanks to descend upon the moving conveyor-belts 37 to be transported thereby.

After the stack S has been conveyed a suitable distance by the belts 37 the shaft 82 is rocked back to initial relationship to return the stop-fingers 80 to vertical position and the rollers 154 will act against the cam-lobes 153 to rock the rests 150 upwardly in readiness to support the first carton-blank B of the next group or series projected into the compartment C. It is to be particularly noted that while the carton-blanks B might rest directly upon the conveyor-belts during their confinement in the compartment C, it has been found that by elevating them slightly thereabove there is less tendency for the belts to scuff or mar the surface of the lowermost carton-blank in the stack.

Blank-alining means

It has been determined in practice that when the stack S is released and commences its movement with the conveyor-belts 37, due to inertia, the lower cartons B in the stack are liable to start their travel prior to that of the upper blanks. In such case the stack may slant rearwardly to eventually result in an irregular relationship of the blanks. To avoid such a condition the present invention provides means in the form of a pusher-plate 160, see Figs. 2, 3 and 4, for engaging the uppermost carton-blanks in the stack to maintain them in substantial alinement with the remainder of the stack as the latter is carried forward by the conveyor-belts 37. The pusher-plate 160 is carried by a rod 161 supported at the upper end of a lever 162. The lever 162 is pivoted on a pin 163 mounted in a bracket 164 fastened to the frame 18 with its lower end connected to the lever 126 by means of a connecting rod 165. When the rod 118 is slid to unlatch the stop-fingers 80 and lower the supporting fingers or rests 150, the pusher-plate 160 is simultaneously moved from the position shown in Fig. 3 to that illustrated in Fig. 4.

Blank-counting device

The counting device 170 for controlling the action of the fingers 80, 150 and pusher-plate 160 is constructed and arranged as next described. The counting device 170 may be placed in any desired location on the apparatus and, as shown in Figs. 3, 15 to 18, it is mounted on an angular bracket 171 attached to the cross-strut 22. Fastened to the lower horizontal shelf portion of the bracket 171 is an angular member or bracket 172 which extends laterally then upwardly to form a bearing 173 for a shaft 174. The shaft 174 projects forwardly from the bearing 173 to mount a bell-crank lever 175 and this end of the shaft is reduced in diameter to receive a ratchet-wheel or disk 180. The ratchet-disk 180 is held against the shoulder thus formed on the shaft 174 by means of a hand-nut 181 screwed onto the threaded extremity of the shaft and set up against the disk. The inner end of the shaft 174 is provided with a threaded axial bore for receiving a screw 176 with a washer 177 interposed between the end of the shaft and the head of the screw to hold the shaft in place in its bearing.

The ratchet-wheel or disk 180 is formed with teeth 182 which may vary in number, the present drawings illustrating the disk as provided with sixty teeth. The disk 180 is further provided with a series of holes 183 equidistantly spaced therearound adjacent its periphery, there being twelve such holes in the present showing; that is, one hole for each five ratchet-teeth. The holes 183 are adapted to receive pins 185 inserted therein from the rear of the disk with their larger portions abutting the rearward face thereof as shown in Fig. 16. Nuts 186 screwed onto the forward threaded extremities of the pins 185 and set up against the front face of the disk serve to hold the pins in place. Pivotally mounted on a stud 188 at the outer end of the substantially vertical arm of the bell-crank lever 175 is a pawl 190 having a pointed end engageable with the teeth 182 of the ratchet-disk 180. The pawl 190 is held in engagement with the ratchet-teeth 182 by means of a spring 189 connected between the pawl and the bell-crank lever 175. A check-pawl 191, in the form of a leaf-spring, is attached to a bracket 192 mounted on the bracket 172 with its end adapted to engage successively with the teeth 182 of the ratchet-disk 180 to prevent retrogressive movement thereof. A helical spring 194 connected between an arm 195 attached to the bracket 172 and the horizontal arm of the bell-crank lever 175 tends to rock the latter in clockwise direction, as viewed in Fig. 15, to move the pawl 190 through an idle stroke to engage it successively with the teeth 182 of the ratchet-disk 180. Such clockwise movement of the bell-crank lever 175 is limited by the engagement of the horizontal arm of the lever with a set-screw 197 mounted on the member 172.

Figure 15:
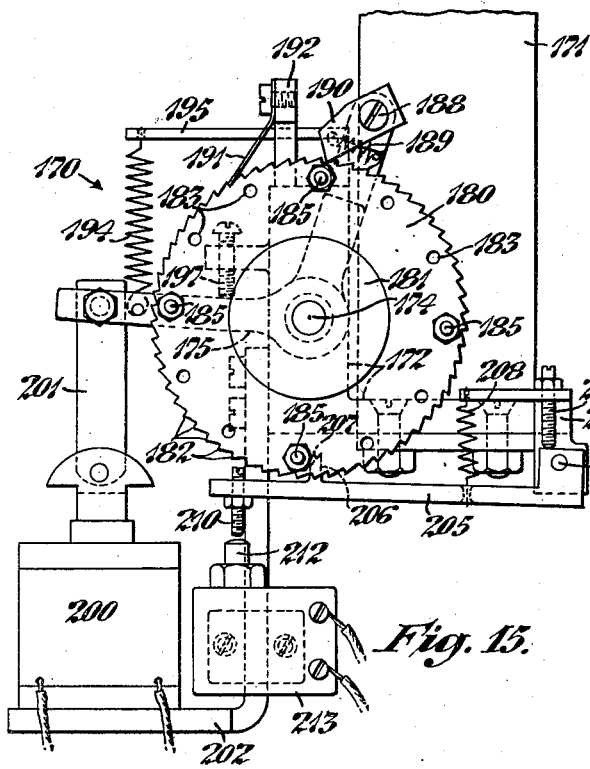
Fig. 15 is a front elevational view of the counting device showing the relationship of its parts during the passage of a sheet or carton-blank into the apparatus.
Figure 16:
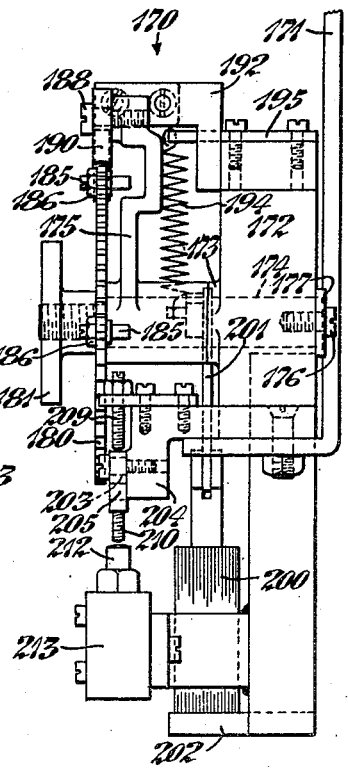
Fig. 16 is a side elevational view of the same.
Figure 17:
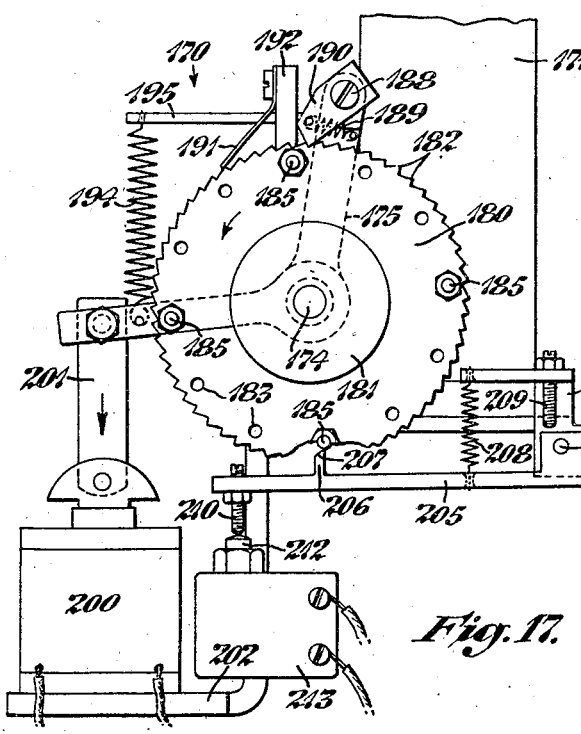
Fig. 17 is a view similar to Fig. 15 showing the relationship of the parts of the counting device at the instant when the rearward or trailing edge of the last carton-blank of a series or group passes across the control unit to complete the stack.

The bell-crank lever 175 is adapted to be rocked in counterclockwise direction, as viewed in Figs. 15 and 17, by means of a link 201 connected between its horizontal arm and the armature of an electromagnet 200. As shown in Fig. 15, the electromagnet 200 is mounted on an angularly-shaped bracket 202 depending from the member 172. Energization of the electromagnet 200 will cause it to rock the bell-crank lever 175 in counterclockwise direction to oscillate the pawl 190 and advance the ratchet-disk 180 the distance of one tooth; while upon deenergization of the electromagnet the spring 194 will return the bell-crank and pawl to initial position.

Pivoted on a pin 203 held in a bracket 204 attached to the horizontal portion of the bracket 171 is a switch-actuating element 205 provided with an upstanding finger 206 which is formed with a beveled edge or cam 207. The element 205 normally is maintained in raised position by a spring 208 with its cam 207 in the path of movement of the pins 185 on the ratchet-disk 180. The spring 208 has one end connected to the element 205 and its opposite end anchored to a flange on the bracket 204. Upward movement of the element 205 is limited by the engagement of its rectangular pivoted end with a set-screw 209 which is adjustable in the flange on the bracket 204. At its outer end the switch-actuator 205 carries an adjustable abutment in the form of a set-screw 210, the lower end of which is adapted to engage the plunger 212 of an electrical switch 213 mounted on the bracket 202 when the element is rocked downwardly. The switch 213 normally is open so that when the actuator 205 is rocked downwardly through the engagement of its cam-finger 206 by a pin 185 on the ratchet-disk 180 the plunger 212 will be depressed to close the switch 213. Referring to the writing diagram of Figs. 19 and 20, it will be observed that the switch 213 is connected in circuit with the electromagnet 142 so that when the switch is closed the electromagnet will be energized to initiate the rotation of the cam 130 and set in motion the instrumentalities described above.

*Control unit*

Figure 11:
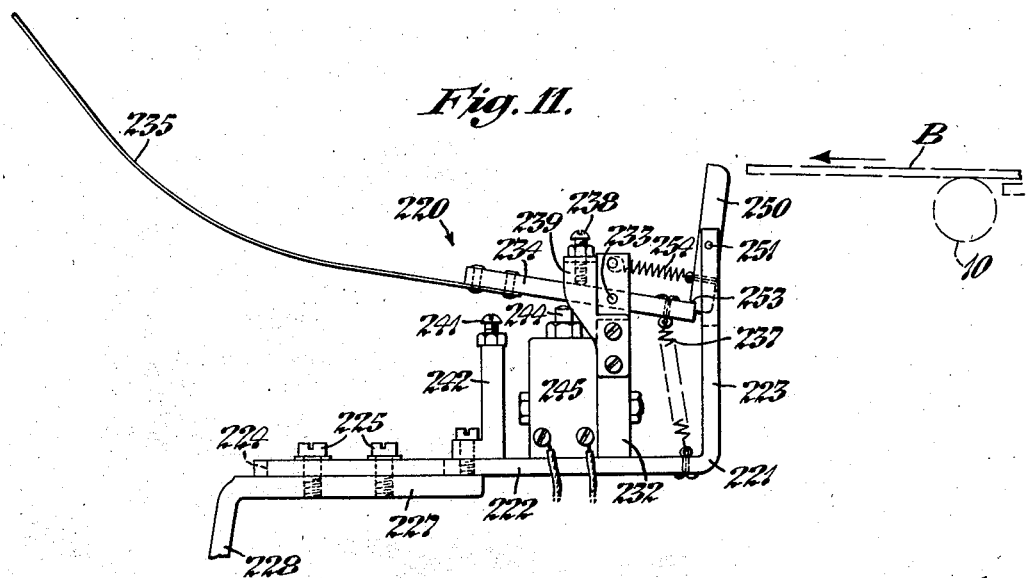
Fig. 11 is a side elevational view of the control unit which is operative by the passage of a sheet or carton-blank into the apparatus to control the actuation of the sheet-counting device, and showing the relationship of the parts of the controller before and after a carton-blank passes thereacross.
Figure 12:
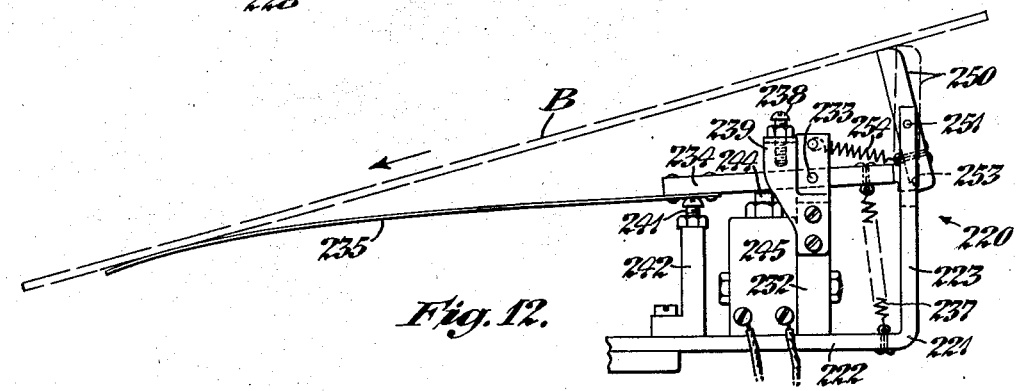
Fig. 12 is a similar view of the control unit showing the relationship of the parts during the passage of a carton-blank thereacross.
Figure 13:
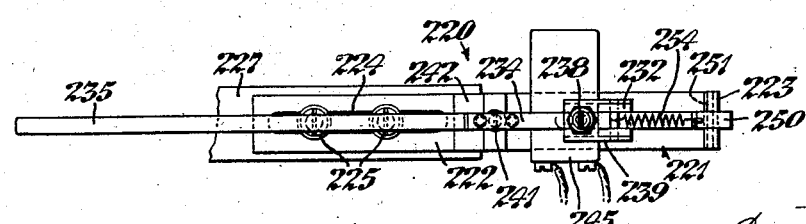
Fig. 13 is a plan view of the control unit with the parts thereof in the same relationship as shown in Fig. 11.

The electromagnet 200 for the counting device 170 is energized through a control-unit indicated generally by the reference character 220. The control-unit 220, shown in detail in Figs. 11, 12 and 13, is mounted on an angular supporting member 221 having a horizontal leg 222 and a vertical arm 223. The leg 222 is provided with an elongated slot 224, see Fig. 13, for receiving screws 225 screwed into threaded holes in the horizontal arm 227 of an angular bracket 228 to mount the member 221 for longitudinal adjustment thereon. As shown in Fig. 3, the lower end of the bracket 228 is fastened by bolts 230 to a plate 229 extending between the struts 22 of the frame 18, and preferably the bolts pass through a vertical slot in the bracket to permit the latter to be adjusted vertically. A post 232, see Figs. 11, 12 and 13, rising from the leg 222 of the member 221 has its upper end slotted to receive a lever 234 pivoted on a pin 233 extending between the sides of the slot. Attached to one end of the lever 234 is a feeler 235 in the form of a curved leaf-spring. The feeler 235 extends rearwardly and upwardly in position to adapt it to be engaged by a carton-blank during the transfer of the latter from the processing machine M to the apparatus 2. The feeler 235 is adapted to be rocked in clockwise direction by a coil-spring 237 connected between the lever 234 and the member 221, rocking movement of the feeler-lever in this direction being limited by its engagement with a set-screw 238. The set-screw 238 is adjustable in an inverted U-shaped bracket 239 fastened to the sides of the post 232. Counterclockwise movement of the lever 234 is limited through its engagement with a set-screw 241 on a post 242 rising from the member 221.

Counterclockwise movement of the lever 234 will cause it to engage and depress the plunger 244 of an electrical switch 245 mounted on the member 221. The switch 245, shown in Figs. 19 and 20 as connected in circuit with the electromagnet 200, is normally closed so that when the lever 234 is rocked downwardly during the passage of a carton-blank B across the feeler 235 the plunger 244 will act to open the circuit to thereby deenergize the electromagnet.

After the carton-blank B has passed beyond the feeler 235 the latter is rocked upwardly by the spring 237. Due to its resilience the feeler 235 has a tendency to vibrate which might cause rapid oscillatory movement of the lever 234 and repeated opening and closing of the switch 245 and to prevent such action the lever is adapted to be restrained by a latch 250 pivoted on a pin 251 at the upper end of the arm 223 of the member 221. The lower end of the latch 250 is notched to provide a shoulder 253 which is normally held in engagement with the end of the lever 234 by means of a spring 254 connected between the latch and the post 232. The upper forward edge of the latch 250 is rounded so that a carton-blank ejected from the machine M may slide across its end and cause it to rock from the position shown in Fig. 11 to that illustrated in Fig. 12 whereby to unlatch the feeler-lever 234. As the blank continues its movement toward the conveyor-apparatus it will depress the feeler 235 in the manner explained above. After the blank passes beyond the feeler 235 the lever 234 will be returned to first position and the shoulder 253 on the latch 250 will reengage its end to prevent it from bouncing or vibrating.

*Table for receiving blanks*

The stacks S of carton-blanks B may be delivered by the conveyor-belts 37 to any desired location, and preferably they are deposited upon a table such as that indicated at 3 in Fig. 1. The table 3 may take the form of an open rectangular frame constructed from angle-irons with longitudinal and transverse struts 261 and 262 supported by legs 260. The legs 260 may further be braced or reinforced by diagonal stays 263 and provided with swiveled casters 264 to adapt the table 3 to be moved from place to place. Equally spaced along the table 3 between the longitudinal struts 261 are rollers 266 having their trunnions 267 journaled in the struts. Thus, it will be observed that as the stacks S of carton-blanks are delivered from the apparatus 2 they will be deposited on the table 3 and permitted to slide along the rolls 266 which form, in effect, a stationary conveyor. An operator standing alongside the table 3 may remove each stack S as it is delivered thereto and tie the blanks together to form a bundle suitable for shipping. The complete apparatus having been described in detail, its method of operation is as next explained.

*Method of operation*

Assuming that the apparatus 2 is to be applied to use with a sheet-processing unit such as the carton-stitching machine M shown in Fig. 1, it is moved into position adjacent the rearward side thereof and the table 3 placed against its end. The wire-stitching machine M is prepared for operation by placing a pile or stack of carton-blanks upon the platform 14 of the elevator 15 and making the necessary adjustments in the carton-feeding and stitching mechanism. The sides and ends of the compartment C next may be adjusted to adapt it to receive the folded and stitched carton-blanks B as they are delivered thereto from the carton-stitcher. To adjust the dimensions of the compartment in accordance with the size of the particular carton-blanks being processed the side-plates 70 first may be moved toward or away from each other to regulate the width of the compartment. The inclined fingers 64 next may be adjusted both laterally and longitudinally and the feeler 235 thereafter adjusted with respect to the fingers to provide for the proper cooperation therebetween. The stop-fingers 80 then may be inserted in the appropriate holes 83 in the rock-shaft 82 and the latter thereafter adjusted longitudinally of the frame 18. To effect this latter adjustment the handwheel 104, see Fig. 5, is first turned to unclamp the bearing plates 85 from the guide-plates 86, after which the bearing plates, together with the shafts 82 and 102 carried thereby, may be shifted longitudinally of the frame 18 to vary the distance between the upstanding stop-fingers 80 and the vertical portions of the fingers 64 in accordance with the length of the particular carton-blanks being processed. After the stop-fingers 80 have been adjusted longitudinally of the apparatus to obtain a compartment of the required length the handwheel 104 is turned to clamp the bearing plates 85 against the guide-plates 86 to maintain the parts in position.

During the longitudinal adjustment of the stop-fingers 80 the latch-operating bar 120 is unclamped from the rod 118 and shifted therealong in position to properly engage with the latching element 100, after which the bar is again clamped to the rod. It will be noted that because the stack-supporting fingers or rests 150 are mounted on the hollow shaft 102 they will always be positioned within the confines of the compartment C to support the carton-blanks above the belts 37.

Figure 18:
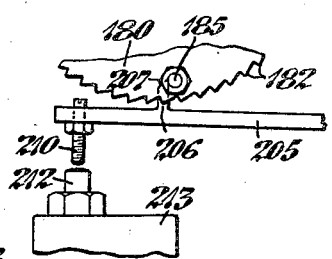
Fig. 18 is a fragmentary front view of the counting device showing the relationship of the ratchet-disk, switch-actuator and the switch after the last blank has been received in the apparatus to complete a stack of blanks and as the stack commences its movement from the apparatus.

As previously explained, it is the usual practice to tie a number of the carton-blanks together to form a bundle suitable for shipping or other purposes. The number of blanks contained in a bundle will vary in accordance with the size of the blanks and the purpose for which they are to be used. For example, relatively large, heavy carton-blanks may be arranged in groups of five, ten or fifteen while smaller blanks may be bundled in groups of twenty to thirty. The carton-blanks B herein shown may be considered as of the larger type and for the purpose of illustration let it be assumed that it is desirable to arrange the blanks in groups or stacks of fifteen units. To adapt the apparatus to stack and deliver the blanks in groups of fifteen a series of four pins 185 are inserted in certain of the holes 183 of the ratchet-disk 180, see Fig. 15. Since the ratchet-disk 180 is provided with sixty teeth 182 and twelve holes 183, one for every five teeth, the pins 185 are inserted in every third hole or, in other words, fifteen teeth apart. After the pins 185 are adjusted in this manner the ratchet-disk 180 is rotated manually in counterclockwise direction until one of the pins 185 is brought into position in advance of the upstanding finger 206 on the switch-actuating element 205 as shown in Fig. 18 and the counting device 170 is then ready for operation. A switch 275 in the main electrical line, see Fig. 19, then may be closed to supply current to the two electrical circuits. As shown in Figs. 19 and 20, one of the circuits includes the switch 245 and electromagnet 200 while the other circuit includes the switch 213 and electromagnet 142. The switch 245 of the controlling unit 229 is of the normally-closed type so that the electromagnet 200 of the counting device 170 normally will be energized. The switch 213 of the counting device 170, however, is of the normally-open type to provide that the clutch-operating electromagnet 142 will be deenergized. Closing the main switch 275 may also energize the electric motor 55 to continuously drive the conveyor-belts 37.

To stitch the flaps of a carton-blank the operator slides the topmost blank B off from the pile held on the elevator 15, folds its panels and inserts it into the stitching machine. As the leading edge of the carton-blank B is entered between the feed-rolls 5 and 6 the latter will feed it across the table 7 of the machine. The leading edge of the blank B will engage a gage, indicated at 11 in Fig. 1, to initiate the operation of the stitching mechanism to fasten the flaps together while intermittently advancing the blank between stitches. After the last stitch of the series has been applied to the blank B the rolls 5 and 6 are rotated at high speed to eject the stitched carton-blank from the machine. As the blank B is discharged from the table 7 across the roller 10 its leading edge will engage the upper end of the latch 258 and rock the latter from the position shown in Fig. 11 to that illustrated in Fig. 12 whereby to unlock the lever 234 and release the feeler 235 carried thereby. As the carton-blank B continues its advance toward the compartment C of the conveyor-apparatus 2 in the manner indicated by the dash-lines in Fig. 12, it will engage with and depress the feeler 235 and lever 234 to the position shown in this view against the action of the spring 237. As the lever 234 is rocked downwardly it will engage with and force the plunger 244 into the housing of the switch 245 to open the circuit to the electromagnet 200 as indicated in Fig. 20. With the electromagnet 200 thus deenergized the spring 194 will rock the bell-crank lever 175 in clockwise direction from the position shown in Fig. 17 to that illustrated in Fig. 15 to retract the pawl 190 through an idle stroke into engagement with the next succeeding tooth 182 on the ratchet-disk 180. During the movement of the pawl 190 the check-pawl 191 will prevent retrogressive movement of the ratchet-disk 180.

As the carton-blank B continues its movement toward the compartment C of the apparatus 2, its rearward or trailing edge will eventually pass beyond the end of the feeler 235 and the feeler-lever 234 thus will be returned to the position shown in Fig. 11 under the action of the spring 237 to release the plunger 244 and close the switch 245 whereby to energize the electromagnet 200 as indicated in Fig. 19. Reenergization of the electromagnet 200 causes its plunger to be drawn downwardly and consequently the bell-crank lever 175 will be rocked in counterclockwise direction and the pawl 190 caused to advance the ratchet-disk 180 a distance equal to the space of one tooth.

As the carton-blank B is thrown through space it will travel in an arcuate path due to the effect of gravity and eventually its forward or leading edge will strike the upstanding stop-fingers 80 to cause the blank to drop into the compartment C in the position shown by the full lines in Fig. 3. Should the carton-blank rebound after striking the fingers 80 the sloping portions of the guides 64 will cause it to slide back into the compartment C under the force of gravity. Upon entering the compartment C the forward end of the carton-blank B will be supported upon and held elevated above the conveyor-belts 37 by the supporting fingers or rests 150 while its rearward end will also be held in raised position by the ledge 60, see Fig. 3. Thus, the blank B will be retained in the compartment C and held from movement with the continuously-moving conveyor-belts 37 which are traveled continuously thereBeneath.

As the operation of the carton-stitching machine M continues another carton-blank B is removed manually from the stack on the elevator 15, folded and fed into the machine. The time interval required to stitch the flaps of a carton-blank depends upon the size of the blank and the number of stitches applied thereto. The operator is usually able to feed the blanks into the machine in closely adjacent relationship so that they will be discharged therefrom at a substantially uniform and relatively rapid rate. As each successive carton-blank B is discharged from the machine M and projected across the control-unit 220 it will depress the feeler 235 and open the switch 245, thereby deenergizing the electromagnet 200 to permit the pawl 190 to engage the next successive ratchet-tooth 182 on the disk 180. As the rearward or trailing edge of the blank B passes beyond the feeler 235 the switch 245 again will be closed to energize the electromagnet 200 to actuate the pawl 190 and rotate the ratchet-disk 180 to an extent equal to the space of one tooth. The operator may continue to fold and insert the blanks B into the machine M and after each blank has been stitched it will be discharged therefrom in the manner explained above to drop into place atop the preceding blanks in the compartment C, eventually building a pile or stack S of blanks as shown in Figs. 3, 4 and 14.

As previously stated, the number of blanks B constituting the pile or stack S depends upon any particular requirement and for the purpose of the present explanation this number is assumed to be fifteen. As the fifteenth carton-blank B is discharged from the machine M it will depress the feeler 235 in the usual manner to cause the pawl 190 to engage the last or fifteenth tooth of the series extending between successive pins 185 on the disk 180. Immediately the trailing end of the fifteenth carton-blank B passes beyond and disengages the end of the feeler 235 the latter will be rocked upwardly to close the switch 245 and energize the electromagnet 200 whereby to cause the pawl 190 to index the ratchet-disk 180 a distance equal to the space of the next tooth. This last indexing movement of the disk 180 will advance one of its pins 185 across the end of the upstanding finger 206 of the switch-actuating element 205. As the pin 185 wipes across the cam-edge 207 on the finger 206 the element 205 will be rocked downwardly about its pivot against the action of the spring 208 to displace it from the position shown in Fig. 15 to that illustrated in Fig. 17. Thus, the abutment or screw 210 on the element 205 will be caused to engage with and depress the plunger 212 of the switch 213 to close its contacts as indicated in Fig. 20 and thereby energize the clutch-operating electromagnet 142. The time interval for closing the circuit to the electromagnet 142 is of relatively short duration since the pin 185 will be carried past the finger 206 almost instantaneously to finally come to rest in the position shown in Fig. 18. As the pin 185 moves beyond the finger 206 of the switch-actuating element 205 the latter will be rocked upwardly by the spring 208 to open the switch 213 and deenergize the electromagnet 142. The counting device 170 thus will be reset for the next operation of registering the number of individual carton-blanks B in the succeeding stack S to be formed.

During the momentary energization of the electromagnet 142 as explained above, its armature-plunger, see Fig. 6, acting through the link 143 and bell-crank lever 141, will withdraw the pin 140 from the clutch 135 to permit the cam-shaft 131 and cam 130 to be rotated from the shaft 33, shown in Fig. 3, through one complete revolution. During the first half revolution of the cam 130 as it turns from the position shown in Fig. 3 to that indicated in Fig. 4 it will act on the follower-roller 146, plate 145 and lever 148 to rock the shaft 127 in clockwise direction. Rocking movement of the shaft 127 in this direction will cause the lever 126, rod 118 and bar 120 to be moved toward the right, or from the position shown in Figs. 3 and 7 to that illustrated in Figs. 4 and 8. Movement of the bar 120 in this direction will cause its shouldered end to first engage the depending portion 124 of the latching element 100 to rock the latter to the position shown in Fig. 8 whereby to release the detent finger 96 on the arm 95 carried by the rock-shaft 82. Continued movement of the bar 120 will cause its end to engage the arm 95 and rock the latter and shaft 82 in counterclockwise direction. As the shaft 82 is thus rocked the stop-fingers 80 will be swung from the position shown in Figs. 3 and 7 to that illustrated in Figs. 4 and 8 to open the end of the compartment C. Simultaneously with the opening of the compartment C the rollers 154 on the arms 155 will be moved out from under the cam-lobes 153 on the supporting fingers or rests 150, see Fig. 10, to permit the latter to rock downwardly under the weight of the stack S of carton-blanks B supported thereon. It will be observed that the operations of the various parts of the conveyor-apparatus as last explained are initiated by the movement of the feeler 235 as the latter is released by the trailing edge of the last carton-blank of the series and consequently this rapidly-moving blank will be positively and accurately deposited in the compartment C before the compartment is opened to discharge the completed stack.

With the stack S of blanks B lowered onto the moving conveyor-belts 37 it will start to travel therewith with its rearward portion riding off from the ledge 60. As the stack S commences its travel with the belts 37 the rod 165 will have been moved by the lever 126 from the position shown in Fig. 3 to that indicated in Fig. 4 whereby to cause the pusher-plate 160 to engage the upper blanks B of the stack and force them forwardly to maintain them in substantial alinement with those in the lower portion of the stack. The belts 37 travel at a relatively fast rate so that the stack S will be transported rapidly thereby and delivered onto the rollers 266 of the table 3, at a point where the operator may tie the stacks to form bundles containing the required number of blanks B.

During the second half revolution of the cam 130 the rods 165 and 118 will move toward the left, as viewed in Fig. 3, whereby to return the pusher-plate 160, supporting rests 150 and stop-fingers 80 to initial position. It will be understood that after the rearward or trailing end of the stack S has been carried beyond the free ends of the stop-fingers 80 the spring 89, acting on the shaft 82, will act automatically to rock the latter in clockwise direction, as viewed in Fig. 8, to return the fingers to operative position. It is to be noted particularly that the rapid action of the cam 130 provides that the stack S will be released and the operating parts of the mechanism thereafter promptly returned to initial position in readiness to act on the first carton-blank of the next series ejected from the machine M. Through this provision the operator of the wire-stitching or other sheet-processing machine may continue to feed blanks into the machine without interruption whereby to maintain maximum efficiency of the complete apparatus and a high rate of production.

It has been explained that the sheet-stacking and delivering apparatus 2 may be so adjusted that any desired number of blanks will be contained in each delivered stack. By inserting the required number of pins 185 in the holes 183 of the sixty-tooth ratchet-disk 180 stacks each containing 5, 10, 15, 20, 30 or 60 blanks may be produced. By providing additional holes 183 in the disk 180 pins 185 could be located between adjacent series of twelve teeth on the disk to effect the production and delivery of groups or stacks each containing a dozen blanks. To obtain stacks containing other quantities of blanks, ratchet-disks having different numbers of teeth and holes may be substituted for the disk 180 shown herein.

Modified form of control unit

Fig. 21 illustrates a modified form of device for controlling the action of the counting means 170 in substitution for the controlling unit 220 previously described. The alternative form of controlling device consists in a photo-electric unit mounted on the conveyor-apparatus 2 in close proximity to the table 7 of the wire-stitching or other sheet-processing machine. As herein shown, the control-unit may comprise a box or housing 280 mounted upon a plate 281 extending between vertical posts 282 rising from the main frame 18 of the apparatus 2 and containing an electric lamp 283 or other source of light. The beam of light, indicated by the dot-and-dash line L, is projected downwardly from the lamp 283 to a photo-electric cell or light-sensitive tube 285 contained within a box 286 carried by a plate 287 attached to the frame 18. The cell 285 is connected in circuit with the windings of a relay-coil 288 so that when the cell is activated by the beam of light L the relay will be energized. The relay-coil 288 normally is energized to swing a switch-arm 289 toward the left, as viewed in Fig. 21, and into engagement with a contact-element 290 against the action of a spring 291. The switch-arm 289 is connected in circuit with the electromagnet 200 of the counting device 170 so that the electromagnet is normally maintained energized.

As a carton-blank B is discharged from the stitching machine M and passes between the boxes 280 and 286, as indicated by dash-lines in Fig. 21, it will interrupt the beam of light L so that the relay-coil 288 will be deenergized. Upon deenergization of the coil 288 the spring 291 will swing the switch-arm 289 away from the contact 290 whereby to open the circuit to the electromagnet 200 of the counting device 170. As before explained, when the electromagnet 200 is deenergized the pawl 190 will be moved through an idle stroke to the position indicated in Fig. 15. After the trailing end of the carton-blank B passes beyond the beam of light L and the latter is again projected to the light-sensitive cell 285 the coil 288 will be reenergized and the switch-arm 289 thus drawn against the contact 290 to close the circuit to the electromagnet 200. Energization of the electromagnet 200, as previously explained, will actuate the bell-crank lever 175 to cause the pawl 190 to advance the ratchet-disk 180 a distance equal to the space of one tooth for the purpose previously set forth.

In Fig. 22 the control-unit is shown as longitudinally adjustable for setting it in position to accurately control the actuation of the stack-releasing means. It will be understood from the foregoing explanation that the operation of the stack-releasing means is controlled by the passage of the trailing edge of the last blank of a series projected across the control unit. It is evident, therefore, that the distance between the upright portion of the fingers 64, forming the forward wall of the compartment C, and the beam of light L must be such that the last carton-blank will have been deposited in the compartment before the complete stack is released to be transported by the conveyor-belts 37. When certain types of carton-blanks are to be collected in the compartment C it is sometimes desirable to adjust the stop-fingers 80 longitudinally of the apparatus 2 to properly receive the blanks as they are discharged from the processing machine. After the stop-fingers 80 have been adjusted to the proper position the fingers 64, defining the forward wall of the compartment C, also are adjusted longitudinally of the apparatus 2 to obtain a compartment of required length. With these two adjustments it is necessary that the photo-electric unit also be shifted longitudinally of the apparatus to maintain the correct relationship between these fingers and the beam of light L. That is to say, it is essential that the stop-fingers 80 will swing downwardly to release the completed stack of carton-blanks B immediately the last blank has been deposited in the compartment C. Should the stack S be released from the compartment C before the last blank of the series is deposited therein this particular blank might be positioned rearwardly of the stack and as a result tend to slide off therefrom during the transfer of the stack by the conveyor-belts 37. On the other hand, should the last blank B of the series be deposited in the compartment C and a relatively long interval elapse before the transfer of the stack therefrom, the time interval between the reception of the blank and the transfer of the stack from the compartment would be of such duration that it would be impossible to return the fingers 80 to initial position before the first carton-blank of the next series was delivered from the processing machine. It is therefore essential that the control-unit be adapted for accurate adjustment relative to the forward end of the compartment to control the swinging movement of the stop-fingers 80.

As shown in Fig. 22 the boxes or housings 280 and 286 of the photo-electric control-unit, previously described, may be mounted on separate plates 269 and 270 extending across the apparatus 2 at its forward end. The plates 269 and 270 may be fastened to brackets 271 and 272 which are carried by the angle-iron posts 282 rising from the frame 18 of the apparatus 2. The brackets 271 and 272 may be provided with elongated slots 273 through which bolts 274 extending therethrough are screwed into threaded holes in the posts 282. With this form of mounting for the parts of the photo-electric control-unit the latter may be adjusted longitudinally in accordance with requirements. The distance through which different types of carton-blanks travel after being discharged from the processing machine varies with their size and weight and it has been found that in some cases the blanks are apt to be thrown beyond the stop-fingers 80. In such event, the entire apparatus 2 may be moved further away from the processing machine M and the fingers 64 and control unit thereafter adjusted longitudinally thereof to obtain the proper cooperation between the several mechanisms.

It has been determined in practice that when the carton-blanks are discharged from the processing machine M and deposited in the compartment C of the apparatus 2 their forward edges will sometimes strike the upstanding stop-fingers 80 with such force that the blanks will rebound rearwardly. Under ordinary conditions any blanks which rebound rearwardly will be guided into the compartment C by the inclined ramp portions of the fingers 64. However, when relatively large, heavy blanks are being deposited in the compartment C and tend to rebound so that their rearward ends rest upon the inclined ramps of the fingers 64 they may be prevented from sliding off therefrom to enter the compartment due to inertia and frictional resistance. To prevent such a condition the present invention provides means for positively guiding the blanks into the compartment. Referring to Fig. 22, the present guiding means may consist in a finger 293 constructed from sheet-metal and pivoted on a rod 294 extending transversely across the apparatus 2 with the ends of the rod held in brackets 295. The brackets 295 may be attached to the plate 269, previously described, and one bracket may be provided with a lug 296. A helical spring 297 having one end anchored to the lug 296 and its opposite end hooked through one of a series of holes 298 in the finger 293 tends to rock the latter downwardly. The finger 293 slopes rearwardly from the hinge-rod 294 and its terminal portion is bent downwardly at a greater angle with its end engaging against one of the fingers 64 at the joinder between its vertical and inclined portions as shown by full lines in Fig. 22.

In operation, as a carton-blank B is discharged by the processing machine and projected toward the compartment C of the apparatus 2, in the manner indicated by the dash-lines in Fig. 22, it will ride under the inclined finger 293 and tilt it upwardly to the position indicated by dash-lines. As the blank B passes beyond the finger 293 it releases the latter to permit it to swing downwardly in the manner of a shutter to the position shown by full lines. When the forward end of the blank B strikes the stop-fingers 80 it may rebound but because of the fact that the finger 293 is in lowermost position the rearward edge of the blank will engage the latter as indicated by the dot-and-dash lines in Fig. 22 and be guided back into the compartment C. The tension of the spring 297 may be adjusted by hooking its end into any one of the holes 298 so that the resistance offered by the finger 293 to the passage of a blank from the processing machine to the compartment C may be reduced to a minimum. Mounting of the finger 293 on the rod 294 supported from the plate 269 provides that when the photo-electric control-unit is adjusted longitudinally the finger likewise will be properly positioned to cooperate with the finger 64 in the manner explained above.

It will be observed from the foregoing specification that the present invention provides an apparatus for counting and stacking sheet-like articles as they are discharged from various types of processing machines and for transporting the stacks of sheets to a desired location. The sheet-counting mechanism of the apparatus is of simple construction and positive in its operation of counting the sheets or blanks as they are discharged from the processing machine and delivered to the apparatus. The mechanism is operated electrically and its actuation controlled by a feeler device or light-sensitive unit actuated by the passage of each blank into the apparatus so that it will positively and accurately count the articles regardless of the speed at which they are discharged from the processing machine.

It also will be observed that the compartment for receiving the sheets or blanks as they are discharged from the processing machine may be adjusted to different dimensions to accommodate sheets of a large variety of sizes. It further will be observed that the device for controlling the actuation of the counting mechanism is operated by the rearward or trailing edge of each blank to insure that the last blank in each series or group will be positively located in the stack before the latter is released to be transported by the conveyor-belts. The stack-releasing and discharging mechanism and parts associated therewith are quickly returned to operative position in readiness to retain the first blank of the next group or stack in the compartment whereby the processing machine may be operated at a comparatively high rate of speed without interruption and its productive capacity maintained at maximum.

While I have herein shown and described the apparatus as embodied in a preferred form of construction with one modified form of controlling unit for use therewith, it is to be understood that other modifications may be made in the structure and arrangement of its parts and in its application to use without departing from the spirit or scope of the invention. Therefore, without limiting myself in this respect, I claim:

1. An apparatus of the type indicated comprising a continuously moving conveyor, a compartment for containing sheet-like objects in stacked relationship above the conveyor and provided with a movable side, means for supporting the objects in the compartment, means for normally maintaining the movable side of the compartment in closed relationship, means for automatically counting the objects as they are stacked individually in the compartment, and means actuated by the last object of a series as it is stacked in the compartment to open the movable side thereof and lower the supporting means to permit the completed stack of objects to be delivered onto the conveyor.

2. An apparatus of the type indicated comprising a continuously moving conveyor, a compartment for containing sheet-like objects in stacked relationship, a gate at one end of the compartment for retaining the objects therein, releasable means for supporting the objects in the compartment, means engageable by the objects for counting them as they are placed in the compartment, and means operable after a predetermined number of objects have been stacked in the compartment for opening the gate and releasing the supporting means from the stack of objects to permit it to be transported from the compartment by the conveyor.

3. An apparatus of the type indicated comprising a continuously moving conveyor, a compartment for containing sheet-like articles in stacked relationship above the conveyor, said compartment having an open bottom and side, means underlying the compartment for normally supporting the stack of articles raised above the conveyor, means for normally closing the open side of the compartment to retain the articles therein, and means operable after a predetermined number of articles have been stacked in the compartment for simultaneously actuating the stack-supporting and compartment-closing means to lower the completed stack of articles onto the conveyor and cause it to be transported from the compartment.

4. An apparatus of the type indicated comprising a continuously moving conveyor, a compartment for containing sheet-like articles in stacked relationship above the conveyor, said compartment having an open bottom and side, rockable rests underlying the compartment for normally supporting the articles raised above the conveyor, a gate for normally closing the open side of the compartment to retain the articles therein, a rock-shaft for rocking the rests and gate, means for latching the rock-shaft in position to maintain the rests and gate in operative relationship, and means operable after a predetermined number of articles have been received in the compartment for unlatching the rock-shaft and rocking it to simultaneously actuate the rests and gate to open the bottom and side of the compartment and permit the stack of articles to descend upon the conveyor to be transported thereby from the compartment.

5. An apparatus of the type indicated comprising a continuously moving conveyor, a compartment for containing sheet-like articles in stacked relationship above the conveyor, said compartment having an open bottom and side, rockable rests normally underlying the compartment for supporting the articles in the compartment, a gate normally positioned to close the side of the compartment, a rock-shaft for rocking the rests and gate into operative or inoperative position, cam-actuated means for rocking the shaft, and means operable after a predetermined number of articles have been stacked in the compartment for initiating the operation of the cam-actuated means to rock the rests and gate to inoperative position whereby to cause the stack of articles to descend upon the conveyor and be transported through the open side of the compartment.

6. An apparatus of the type indicated comprising a continuously moving conveyor, a compartment for containing sheet-like articles in stacked relationship adjacent the conveyor, means normally operative to withhold the articles from movement with the conveyor, means operable after a predetermined number of articles have been stacked in the compartment for releasing the withholding means to permit the completed stack to engage the conveyor and be transported thereby, and means operable as the stack commences its travel with the conveyor for maintaining the stacked articles in substantial alinement.

7. An apparatus of the type indicated comprising a conveyor, a compartment arranged above the conveyor for receiving sheet-like articles to maintain them in stacked relationship, said compartment being constituted by opposite laterally adjustable side walls and end walls, one of said end walls being relatively stationary and the opposite end wall being longitudinally adjustable and rockable to adapt it to open the end of the compartment, rockable rests arranged beneath the compartment and normally positioned to support the articles stacked therein, means for automatically counting the articles as they are deposited in the compartment, and means operable after a predetermined number of articles have been stacked in the compartment for rocking the rests to adapt the completed stack of articles to descend onto the conveyor and simultaneously rocking the end wall of the compartment to open the latter and permit the stack to be transported from the compartment by the conveyor.

8. An apparatus of the type indicated comprising a continuously moving conveyor, means for supporting objects in stacked relationship adjacent said conveyor, means for counting the objects as they are stacked on the supporting means, means operable after a predetermined number of objects have been stacked on the supporting means for transferring the completed stack from the supporting means to the conveyor, and a pusher adapted to engage the side of the stack as it commences to travel on the conveyor and movable therewith to maintain the stacked articles with their edges in substantial alinement.

GEORGE H. HARRED.

REFERENCES CITED

The following references are of record in the file of this patent:

UNITED STATES PATENTS

| Number | Name | Date |
|---|---|---|
| 1,600,958 | Hart et al. | Sept. 21, 1926 |
| 1,943,500 | Winkler et al. | Jan. 16, 1934 |
| 1,318,910 | Pfohl | Oct. 14, 1919 |
| 1,412,795 | Pfohl | Apr. 11, 1922 |
| 1,569,032 | Reichel | Jan. 12, 1926 |
| 2,122,710 | Bidwell et al. | July 5, 1938 |
| 2,231,179 | Bleistein | Feb. 11, 1941 |
| 2,256,327 | Parkes et al. | Sept. 16, 1941 |
| 1,208,465 | Boreham | Dec. 12, 1916 |

FOREIGN PATENTS

| Number | Country | Date |
|---|---|---|
| 669,908 | Germany | Jan. 6, 1939 |
| 422,384 | Great Britain | Jan. 10, 1935 |